Oct. 1, 1940. S. L. WEISS 2,216,149
SWIVELING BRACKET
Filed March 8, 1938

SAMUEL L. WEISS
INVENTOR.

BY *Joseph Blacker*
ATTORNEY.

Patented Oct. 1, 1940

2,216,149

UNITED STATES PATENT OFFICE 2,216,149

SWIVELING BRACKET

Samuel L. Weiss, Brooklyn, N. Y.

Application March 8, 1938, Serial No. 194,587

1 Claim. (Cl. 248—75)

This invention relates to a portable supporting bracket comprising a rubber suction cup by means of which it is possible to support an article on any plane surface, such as a smooth wall, etc.

An object of this invention is to provide a detachable supporting bracket comprising a spring clip designed to frictionally grip the tubing of a bath spray and by means of which the spray may be detachably secured on a wall, or the like.

Another object of this invention resides in the provision of a supporting bracket including a suction cup made of soft rubber which is distortable to cause it to create a suction when reflexed upon a flat surface, whereby it is caused to adhere thereto.

Another object of this invention is to provide a supporting bracket having a supporting member which comprises complementary members spaced apart from each other, the said members being designed to individually grip and support a bath spray tube at a plurality of points along its length and in an arc of a circle.

Another object of this invention is to provide a swiveling connection between the supporting member and the supporting bracket which will permit universal adjustment of the spray head by moving the supporting member about the swiveling connection without any manipulation of any other part than the supporting member and which will hold its position of adjustment of its own accord.

With the above and other objects in view, the invention will be hereinafter more particularly described, and the combination and arrangement of parts will be shown in the accompanying drawing and pointed out in the claim which forms part of this specification.

Reference will now be had to the drawing, wherein like numerals of reference designate corresponding parts throughout the several views, in which.

Figure 1:
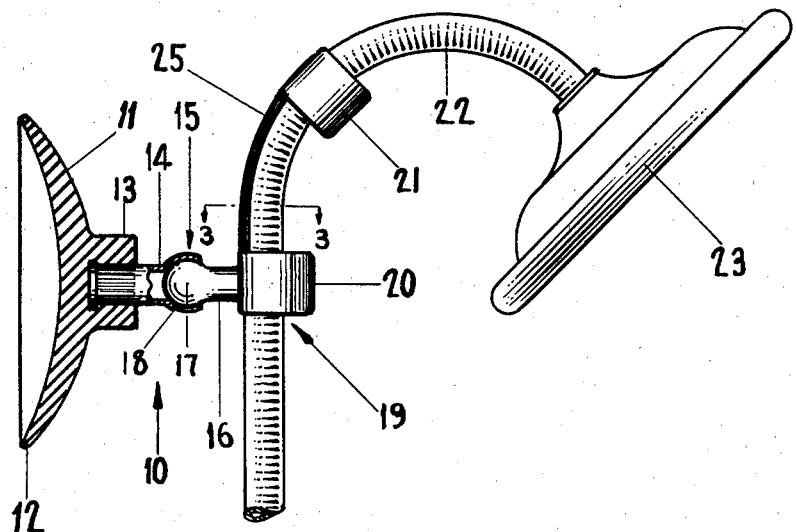
Figure 1 is a side elevation of a bath spray head and tubing mounted in supported relation in a swiveling supporting bracket.
Figure 2:
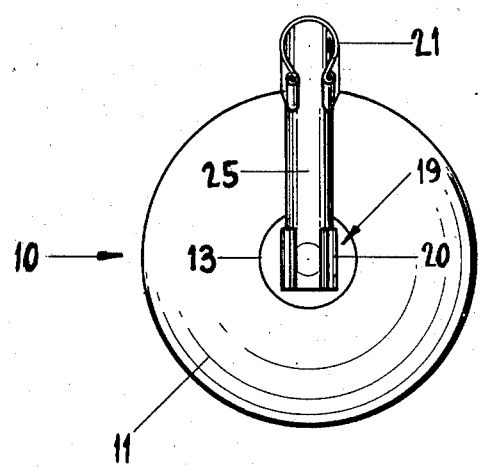
Figure 2 is a front elevation of the supporting bracket shown in Figure 1.

In the illustrated embodiment of the invention the numeral 10 indicates a supporting bracket comprising a suction cup 11 which is circular in shape and reduced to a comparatively sharp circular edge 12 and having a central boss or shank 13 centrally positioned opposite said cup. The boss 13 may be provided with a cavity serving to receive one end portion 14 of a ball-joint 15. The cup 11 is made of soft rubber with the end portion 14 of the ball-joint preferably secured therein in non-rotative engagement by adhesion due to vulcanization.

The ball-joint 15 comprises a complementary member 16 having a ball 17 at one end, the said ball being housed in frictional engagement in a socket 18 at the outer end of the end portion 14.

A spring clip or supporting member 19 is fastened by riveting or in any other suitable manner, to the ball ended member 16. The supporting member 19 preferably comprises a spring clip member 20 and a complementary spring clip member 21 which is integral therewith. The spring clip members 20 and 21 are preferably of circular cross-section and are widely spaced apart from each other so as to provide two widely spaced points of support for a tubular member such as the rubber tubing 22 of a bath spray 23.

Figure 3:
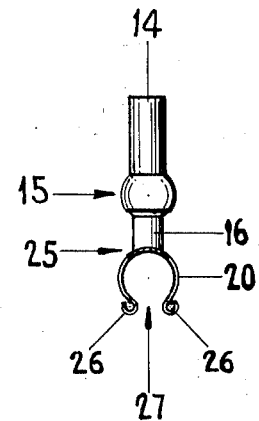
Figure 3 is a view of a ball-joint having a spring clip secured thereto, the clip being in section, the section being taken as on line 3—3 in Figure 1.

The spaced relation of the clip members 20 and 21 is determined by the length of an elongated portion 25 of the spring clip 19. The portion 25 is preferably of arcuate cross-section, as best shown in Figure 3, so as to be reinforced against bending. It is to be noted that the arcuate portion 25 is very narrow so as to contact only a narrow strip of the outer circumference of the tube 22 and so as to support the tube in curved form without restraining the removal thereof from the clips. Each clip member has two outwardly flared ends 26, 26, which are widely spaced apart and between which a cylindrical member such as the rubber tube 22 may be easily passed into supporting relation.

It is to be noted that the arcuate portion 25 of the spring clip 19 is preferably bent to a radius corresponding to the curve assumed by the rubber tube 22 with the spray head 23 attached thereto and facing downwardly. The said curve, as shown, is the normal curve assumed by the tube and provides free flow of the liquid in the tube.

From the drawing, it will be seen that the supporting bracket carrying the article is adapted to be attached to any flat surface irrespective of the position of the same by pressing the suction cup against the supporting surface and in the present instance the article may be adjusted by swinging the clamping member on the pivotal connection to the suction cup, the suction cup providing a quick and convenient means for attaching and detaching the bracket. In using the bracket with a spray head the device can be applied to any flat surface vertically disposed or otherwise which is of sufficient area to receive the suction cup.

The importance in the provision of a swiveling connection lies in the fact that the suction cup 11 may remain permanently attached to a fixed surface, with the spring clip members 20 and 21 ready for receiving or removing an article. The swiveling connection provides circular motion about a fixed point and makes it possible to adjust the mounted article in both horizontal and vertical planes simultaneously.

It is to be noted that the spring clip members or spring arms 20 and 21 have openings between their two outwardly flared outer ends 26. Each opening 27 faces outwardly and downwardly, that is, away from the surface to which the suction cup is attached and so that the user may detach the article, such as the tubing 22 and spray head 23, leaving the supporting bracket 10 attached to the wall. The user may thus employ the spray head inside a bath tube while he is in a sitting or lying position therein.

In accordance with the provisions of the patent statutes I have described the operation of my invention, together with the form which I now consider to represent the best embodiment thereof; but I desire to have it understood that the device shown is only illustrative and that the invention may be carried out by other means within the scope of the appended claim. I may permanently fasten the spring clip to the vacuum cup so that there will not be any relative motion between these parts. The cup would then be depended upon to provide the necessary adjustment for the article being supported.

I may modify the socket 18 shown in Figure 1, by cutting out the lowermost portion 44 to permit the shank 16 to move into said cutout and the spray-head 23 to assume a substantially horizontal position.

I claim:

A bracket for detachably supporting a spray head and nose and for arcuately directing the free outflow therefrom, comprising a rubber suction cup attachable to a surface and having a boss extending therefrom opposite said cup, a connecting member operatively secured to said boss, an elongated supporting member secured to said connecting member, said supporting member having two resilient clips widely spaced apart from each other, both of said clips having outwardly diverging holding-wings adapted for detachably receiving a tube therebetween, each of said clips forming part of an arcuate supporting guideway extending generally in line with the axis of said cup, said clips being integral with a connecting section forming part of said arcuate guideway, said clips being of substantially U-shaped cross-section and widely open so as to be easily expanded to facilitate insertion and removal of said tube, said guideway being of an arcuate form assumed by said hose in overhead service position and adapted to contact only an elongated strip of said hose adjoining said suction cup, whereby said spray head and hose may be removed from said bracket without detaching said bracket from said surface.

SAMUEL L. WEISS.